(12) United States Patent
Jaudon et al.

(10) Patent No.: US 8,549,145 B2
(45) Date of Patent: *Oct. 1, 2013

(54) PRE-ACCESS LOCATION-BASED RULE INITIATION IN A VIRTUAL COMPUTING ENVIRONMENT

(75) Inventors: Joe Jaudon, Sedalia, CO (US); David Lowrey, Denver, CO (US); Adam Williams, Aurora, CO (US)

(73) Assignee: Aventura HQ, Inc., Denver, CO (US)

( * ) Notice: Subject to any disclaimer, the term of this patent is extended or adjusted under 35 U.S.C. 154(b) by 133 days.

This patent is subject to a terminal disclaimer.

(21) Appl. No.: 13/368,954

(22) Filed: Feb. 8, 2012

(65) Prior Publication Data

US 2012/0203906 A1 Aug. 9, 2012

Related U.S. Application Data

(60) Provisional application No. 61/440,727, filed on Feb. 8, 2011.

(51) Int. Cl.
*G06F 15/173* (2006.01)
(52) U.S. Cl.
USPC ............ 709/225; 709/217; 709/238; 713/168
(58) Field of Classification Search
USPC ........................................................ 709/225
See application file for complete search history.

(56) References Cited

U.S. PATENT DOCUMENTS

| 8,149,431 B2 * | 4/2012 | Barton et al. ................. 358/1.13 |
| 2006/0111125 A1 * | 5/2006 | Karaoguz ................... 455/456.2 |
| 2006/0285535 A1 * | 12/2006 | Metcalf et al. ................. 370/352 |
| 2007/0005967 A1 * | 1/2007 | Mister et al. ................... 713/168 |
| 2007/0180450 A1 * | 8/2007 | Croft et al. ......................... 718/1 |
| 2011/0173251 A1 * | 7/2011 | Sandhu et al. ................ 709/203 |
| 2012/0096159 A1 * | 4/2012 | Short et al. .................... 709/225 |
| 2013/0080780 A1 * | 3/2013 | Mister et al. ................... 713/168 |

\* cited by examiner

*Primary Examiner* — Tauqir Hussain
(74) *Attorney, Agent, or Firm* — Holland & Hart LLP

(57) ABSTRACT

Methods, systems, and devices are described for updating resource access permissions in a virtual computing environment. In these methods, systems, and devices, a host computer system determines that a user associated with an existing session has moved from a first location to a second location, identifies at least one pre-access rule based on the second location, applies the at least one pre-access rule to the existing session before authenticating the user for access to the existing session in response to the determination that the user has moved to the second location, and authenticates the user at the second location for access to the existing session after the at least one pre-access rule has been applied to the existing session.

26 Claims, 11 Drawing Sheets

PRE-ACCESS LOCATION-BASED RULE INITIATION IN A VIRTUAL COMPUTING ENVIRONMENT

CROSS REFERENCES

The present application claims priority from U.S. Provisional Patent Application Ser. No. 61/440,727, entitled "PRE-ACCESS LOCATION-BASED RULE INITIATION IN A VIRTUAL COMPUTING ENVIRONMENT" and filed on Feb. 8, 2011, which is incorporated herein by reference in its entirety for all purposes.

BACKGROUND

The present invention relates to computer network communication, and more particularly, to updating resource access permissions in a virtual computing environment.

Various computer systems may use a thin-client or a virtual desktop display in conjunction with a centralized server computer system or mainframe. Virtualization is a logical representation of a computer in software. By decoupling the physical hardware from aspects of operation, virtualization may provide more operational flexibility and increase the utilization rate of the underlying physical hardware. Although virtualization is implemented primarily in software, many modern microprocessors now include hardware features explicitly designed to improve the efficiency of the virtualization process.

A virtual desktop display can be served to client devices from a central or distributed server computer system. The server may receive input and output over a network or other communication medium established between the device and the server. In some examples, a thin-client device may run web browsers or remote desktop software, such that significant processing may occur on the server.

In many instances, roaming users may be delayed as they transition to new applications when they move to new locations. This wait time can significantly impact productivity and efficiency. Thus, there may be a need in the art to reduce wait periods as users roam and transition in and out of different workflows.

SUMMARY

Methods, systems, devices, and computer program products are described for pre-access location-based rule initiation in a virtual computing environment.

In a first set of embodiments, system for implementing a virtual computing environment includes a host computer system and a client device. The host computer system is configured to determine that a user associated with an existing session has moved from a first location to a second location, identify at least one pre-access rule based on the second location, apply the at least one pre-access rule to the existing session before authenticating the user for access to the existing session in response to the determination that the user has moved to the second location, and authenticate the user at the second location for access to the existing session after the at least one pre-access rule has been applied to the existing session. The client device is configured to communicate with the host computer system to provide a user interface to the existing session for the user at the second location.

In a second set of embodiments, a method of updating a session in a virtual computing environment includes determining at a host computer system that a user associated with an existing session has moved from a first location to a second location; identifying at least one pre-access rule based on the second location; applying the at least one pre-access rule to the existing session before authenticating the user for access to the existing session in response to the determination that the user has moved to the second location; and authenticating the user at the second location for access to the existing session after the at least one pre-access rule has been applied to the existing session.

In a third set of embodiments, a host computer system includes a location identification module, a rules module, and an authentication module. The location identification module is configured to determine that a user associated with an existing session has moved from a first location to a second location. The rules module is configured to identify at least one pre-access rule based on the second location and apply the at least one pre-access rule to the existing session before authenticating the user for access to the existing session in response to the determination that the user has moved to the second location. The authentication module is configured to authenticate the user at the second location for access to the existing session after the at least one pre-access rule has been applied to the existing session.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

User movement may be monitored during a session in a virtual computing environment. The session may be dynamically adapted in response to this movement. Before a roaming user is authenticated for access to a session, action (e.g., initiating or hiding an application) may be taken dynamically so that the necessary desktop and/or session attributes may be in place when the user is authenticated (or sooner thereafter). This action may be based, for example, on a variety of location detection techniques to identify user location. Using this pre-authentication action to adapt a session dynamically, workflow can be anticipated and wait times for applications at new locations may be reduced.

This description provides examples only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention from the beginning of the access period.

Thus, various embodiments may omit, substitute, or add various procedures or components as appropriate. For instance, it should be appreciated that in alternative embodiments the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, devices, and software may individually or collectively be components of a larger system, wherein other procedures may take precedence over or otherwise modify their application. Also, a number of steps may be required before, after, or concurrently with the following embodiments.

Figure 1:
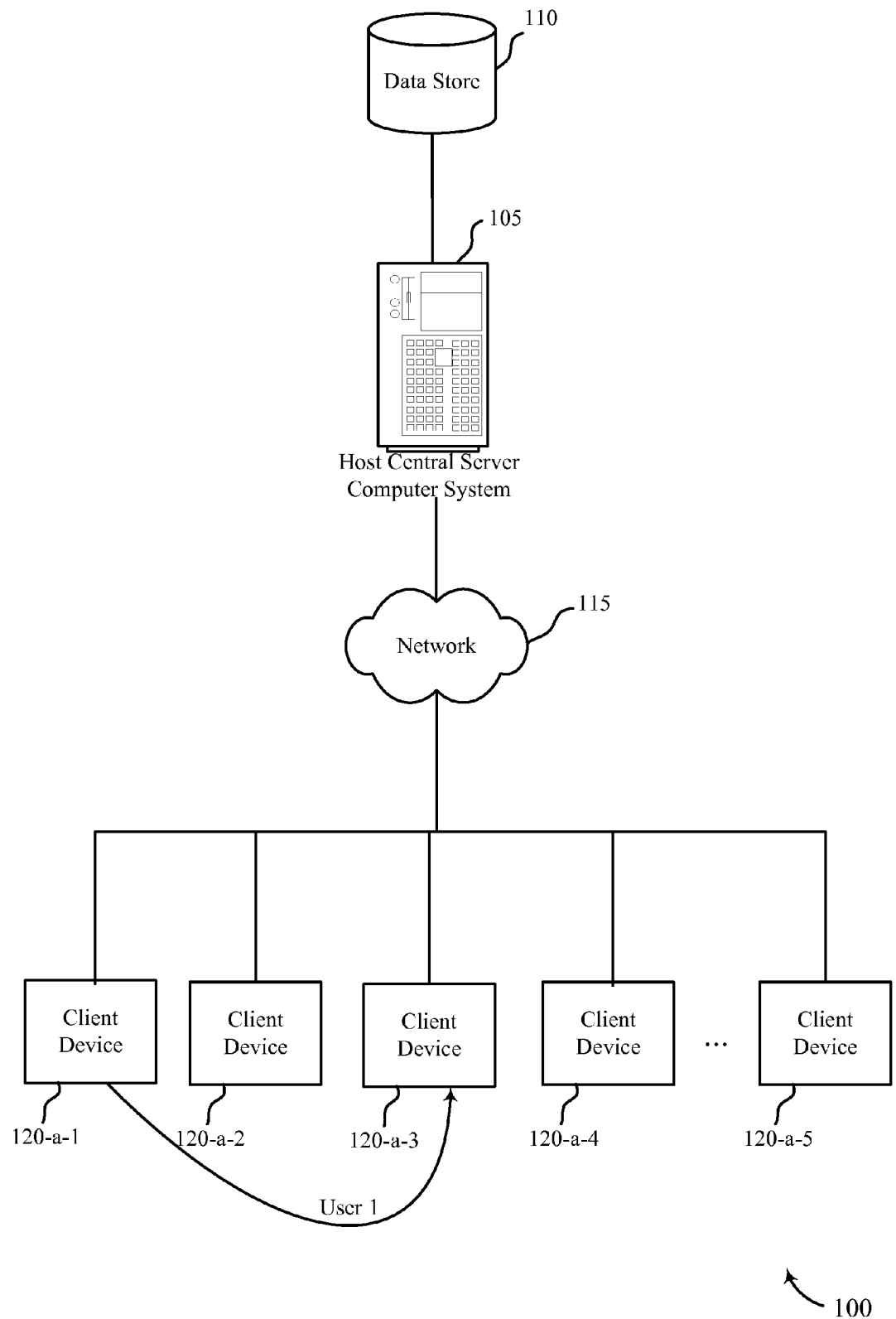
FIG. 1 is a block diagram of an example system including components configured according to various embodiments of the invention.

Systems, devices, methods, and software are described for a virtual computing environment. In one set of embodiments, shown in FIG. 1, system 100 includes a host central server computer system 105, data store 110, network 115, and client devices 120. Each of these components may be in communication with each other, directly or indirectly.

The host central server computer system 105 may be configured to run sessions of a virtual computing environment for one or more users, and the session may be allowed to roam with a user as he or she moves between client devices 120. In some embodiments, some of the functions of the host central server computer system 105 in this process may be distributed to or among the client devices 120. The host central server computer system 105 may control the application of different access permissions for users (or user types) at differing locations. The host central server computer system 105 may serve a session to specific client devices 120 in the network, while dynamically modifying access permissions based on location. As used herein, a virtual computing environment includes any network whereby KVM (keyboard, video, and mouse) functionality is decoupled from the computer(s) serving the session through techniques of virtualization. As used herein, the term "session" refers to a hosted session of a virtual computing environment that may be accessed from one or more client devices. For example, a session may include a thin client session, a virtual application session, a virtual machine session, a virtual operating system session, and/or the like.

The host central server computer system 105 may include a session manager and rules engine to allocate and manage sessions (and their related access permissions) within the network. The host central server computer system 105 may be made up of one or more server computers, workstations, web servers, or other suitable computing devices. The host central server computer system 105 may be fully located within a single facility or distributed geographically, in which case a network may be used to integrate different components. Although the illustrated embodiment shows that a host central server computer system 105 performs the allocation and management, in other examples these functions may be performed by a virtual server, resident in whole or in part on one of the client devices 120, or distributed among client devices 120. A client device 120 may be a personal computer, laptop, tablet, personal digital assistant (PDA), thin client, mobile device, cellular telephone, medical equipment or device, or any other computing device, and may have wired or wireless connections.

Rules for allocating sessions, monitoring sessions, and updating sessions based on location and other factors may be stored locally by the host central server computer system 105, or may be stored (in whole or in part) at data store 110. Data store 110 may be a single database, or may be made up of any number of separate and distinct databases. The data store 110 may include one, or more, relational databases or components of relational databases (e.g., tables), object databases, or components of object databases, spreadsheets, text files, internal software lists, or any other type of data structure suitable for storing data. Thus, it should be appreciated that a data store 110 may each be multiple data storages (of the same or different type), or may share a common data storage with other data stores. Although in some embodiments the data store 110 may be distinct from a host central server computer system 105, in other embodiments it may be integrated therein to varying degrees.

In some examples, a host central server computer system 105 monitors user sessions (e.g., via direct monitoring or via reports from client devices 120). To initiate a session, a user may log on to a client device 120-*a*-1 by presenting authentication credentials (e.g., a user name, password, key card, key fob, and/or biometric sign-in, etc.), and the client device 120-*a*-1 may transmit the authentication credentials or other information to the host central server computer system 105. The host central server computer system 105 may direct a session to be started for the user. In certain examples, the host central server computer system 105 may begin to initiate the session before authentication of the user has occurred or is completed. One or more default aspects and/or settings may be applied to the session, and the user may be granted certain access permissions for the session (e.g., access permissions to drives, directories, folders, files, applications, etc.). Certain of these default aspects, settings, and access permissions may be based on the location of the client device 120-*a*-1 (e.g., and also be based on user type, client device type, session type, etc.).

When a user logs out, the session may be maintained (e.g., for a system specified time period, a user-specified time period, a user specific time period, or indefinitely). The user may then move to a different client device 120-*a*-3 at a second location. Before the user is authenticated at client device 120-*a*-3 for access to the existing session, one or more pre-access rules associated with the second location (e.g., and the user, client device type, session type, etc.) may be identified and applied to the session by the host central server computer system 105. Thus, before the user accesses the existing session at the second location, the session may be updated based on at least the second location. As such, the user may be able to access his or her session from client device 120-*a*-3 much more quickly than if the session were updated after the user had been completely authenticated for access to the session. After the one or more location-based pre-access rules has been applied to the session, the user may complete authentication (e.g., with a user name, password, key card, key fob, Near Field Communications (NFC) transceiver, RFID device, and/or biometric sign-in, etc.) and access the session via client device 120-*a*-3.

There may be location-specific rules for updating one or more aspects, settings, and/or access permissions of the session, applicable to individual users, types of users, sessions, types of sessions, applications, specific client devices, types of devices, etc. The location-specific rules may apply to a particular client device, all client devices in an area, or certain types of client devices in an area. The aspects and settings of the session may, for example, relate to an appearance of a user interface for the session, the status of one or more applications within or associated with the session, the value of one or more session variables, the association of one or more printers or other default peripheral devices with the session, and/or the like. The access permission rules may relate to controlling, restricting, manipulating, or restricting resources. Resources may include applications, computing resources, network resources, system resources.

Various types of action may be initiated according to the one or more location-based pre-access rules. In certain examples, the action may be to allow or block access to a resource, such as, for instance, a folder in a network drive, an application, and/or a network. In additional or alternative examples, the action may be to create, open, close, or delete an application, a file, a user profile, a setting, or the like. In still other additional or alternative examples, the action may be to open or hide a certain aspect of the session. For instance, an application associated with the session may continue to run in the background, but the access permission rule may hide the application from the user, thereby preventing the user from viewing or access the running application through the session. Additionally or alternatively, the action may affect some other aspect of the user interface of the session, such as minimizing or maximizing a certain application, file, or folder; reordering the display of graphical elements in the session; moving graphical elements in the session; drawing certain graphical elements in the session; painting certain graphical elements in the session; filling certain graphical elements in the session; clearing certain graphical elements in the session; and/or coloring certain graphical elements in the session.

In additional or alternative examples, the action initiated according to the one or more location-based pre-access rules may include displaying certain text or graphics to the user, prompting the user to provide textual or other input to the session, and/or initiating communications via input/output (I/O) devices or ports. In still other additional or alternative examples, the action may include modifying a session variable based on the second location, associating or disassociating one or more printers or other peripheral devices with the session based on the second location, and/or modifying a security setting associated with the session based on the second location.

The host central server computer system 105 may identify any location-specific pre-access rules applicable to the log-on to client device 120-*a*-3, and initiate actions according to the rules. After initiating the performance of these actions to apply the pre-access rules to the session, the host central server computer system 105 may authenticate the user, and serve the session to client device 120-*a*-3.

Thus, the host central server computer system 105 may follow individual sessions, and detect when a location-based pre-access permission rule is triggered by monitoring user movement. The host central server computer system 105 may call up the resultant action, and either modify the session or transmit modification information accordingly prior to authenticating the user for access to the session at the new location. Using this technique, sessions can be adapted dynamically based on location while minimizing delays perceived by the user when accessing the session for the first time after changing locations.

The components of the system 100 may be directly connected, or may be connected via a network 115 which may be any combination of the following: the Internet, an IP network, an intranet, a wide-area network ("WAN"), a local-area network ("LAN"), a virtual private network, the Public Switched Telephone Network ("PSTN"), or any other type of network supporting data communication between devices described herein, in different embodiments. The network 115 may include both wired and wireless connections, including optical links. Many other examples are possible and apparent to those skilled in the art in light of this disclosure. In the discussion herein, a network may or may not be noted specifically. If no specific means of connection is noted, it may be assumed that the link, communication, or other connection between devices may be via a network.

Figure 2:
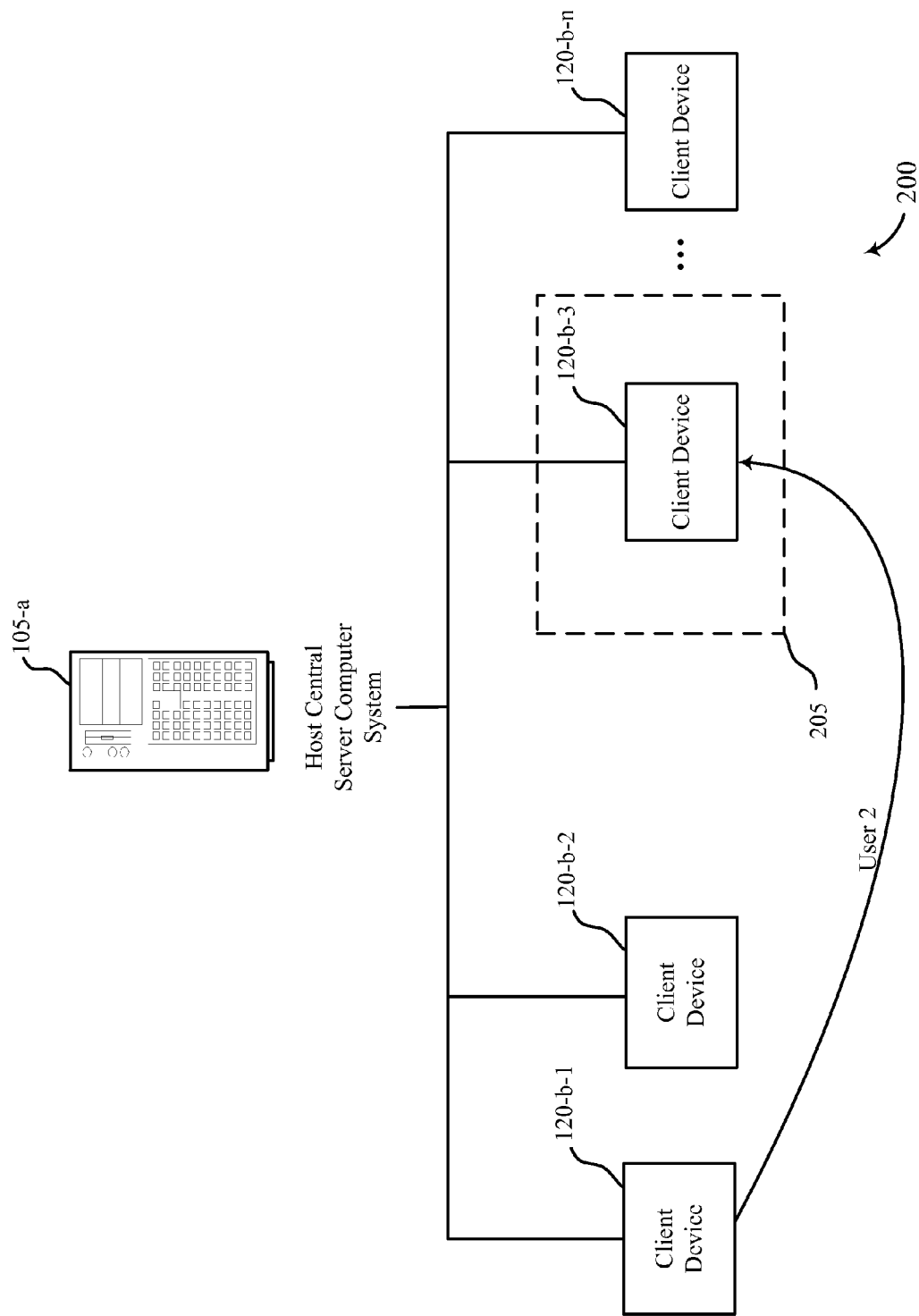
FIG. 2 is a block diagram of an example system including components configured according to various embodiments of the invention.

Turning next to FIG. 2, this diagram illustrates a system 200 which includes a host central server computer system 105-*a* and devices 120. This system 200 may be an example of the system 100 of FIG. 1, and the host central server computer system 105-*a* may be the host central server computer system 105 of FIG. 1. Each of these components may be in communication with each other, directly or indirectly. At an initial period of time, user 2 may provide one or more authentication credentials to client device 120-*b*-1. The client device 120-*b*-1 may query the host central server computer system 105-*a* about the user, and the host central server computer system 105-*a* may check to see if the user has a current session running. If the user has no current session running, the host central server computer system 105-*a* may authenticate the user (e.g., using a second authentication credential) and direct a session to be started. In certain examples, the host central server computer system 105-*a* may direct the session to be started before completing the authentication of the user. Alternatively, the session may be started after the user is authenticated. The KVM function of the session may be provided to the client device 120-*b*-1 to which user 2 logged in. User 2 may be granted various location-specific access permissions applicable to the client device 120-*b*-1. In this example, the location-specific access permission rules are region-specific rules. Thus, access permission rules are applicable to certain regions (e.g., to certain rooms, types of rooms, floors, portions of floors, multi-floor areas, regions, etc). User 2 may then log off of client device 120-*b*-1, moving toward client device 120-*b*-3.

The host central server computer system 105-*a* may detect the movement of user 2 to region 205 prior to user 2 actually logging on to his or her session at client device 120-*b*-3. This detection may occur in a number of ways. In certain examples, user 2 may present one or more access credentials (e.g., an access card token, an RFID token, a passcode, a biometric token, etc.) to a reader associated with controlled access to region 2. The access credentials may be received by the host central server computer system 105-*a* and associated with user 2 to determine that user 2 has moved to region 205. Additionally or alternatively, the host central server computer system may use one or more other types of sensors to track the movement of user 2 to region 205. In additional or alternative examples, the host central server computer may receive a first authentication credential in a dual-factor authentication process from user 2 at client device 120-*b*-3 and determine that user 2 has moved to region 205 before completing the dual-factor authentication process.

In response to determining that user 2 has moved to region 205, the host central server computer system 105-*a* may identify the session associated with user 2 and any location-based pre-access rules to begin applying to the session before the user completes authentication at client device 120-*b*-3 and has access to the session. As noted, there may be region-specific (e.g., area-specific, floor-specific, etc.) pre-access rules for individual users, types of users, sessions, types of sessions, applications, devices, types of devices, and types of regions. The pre-access rules may specify the appearance of the user interface of the session, the control or access (e.g., to drives, directories, files, folders, applications, etc.) allowed at different locations, the behavior of applications in the session at different locations, and the like. As described in more detail with reference to FIG. 1 above, any or all of the following actions may be undertaken according to a region-specific access permission rule: create, hide, close, minimize, maximize, normalize, reorder, draw, paint, line, text, color, fill, clear, move, keyboard input, direct i/o, delete, open, execute, and/or kill.

The host central server computer system 105-*a* may identify any user-specific or user type-specific location-based pre-access rules applicable to the determination that user 2 is within location 205-*b,* and initiate actions according to the region-specific access permission rules. These actions may be initiated before the user has signed-in completely. The host central server computer system 105-*a* and/or client device 120-*b*-3 may query user 2 for additional authentication factors (e.g., a password), while the access permission actions have already been initiated.

Thus, in one example, user 2 may provide a first authentication credential (e.g., username, access card token, biometric token, etc.) to client device 120-*b*-3. Prior to allowing user 2 to access his or her existing session, the host central server computer system 105-*a* may identify user 2 from the first authentication credential, determine that user 2 has moved to region 205, identify the pre-access rules applicable to user 2 at region 205, and initiate actions associated with applying the relevant pre-access rules to the session. A second authentication credential (e.g., password, PIN, etc.) provided by user 2 at client device 120-*b*-3 may then be accepted, the host central server computer system 105-*a* may complete authenticating user 2, and user 2 may be allowed to access his or her session via device 120-*b*-3, as modified by the actions initiated based on the pre-access rules.

By way of illustration and not limitation, consider the example in which user 2 is a medical worker and region 205 is an individual examination room at a medical facility. The medical worker may be examining medical files for a first patient at client device 120-*b*-1, and then walk to the entrance of the examination room (region 205). At the entrance to the examination room, the medical worker may swipe an access card or provide some other type of credential to the host central server computer system 105-*a*. Based on the credential, the host central server computer system 105-*a* may determine that the medical worker has moved to the examination room (region 205) and apply a set of rules to the medical worker's session which hide the medical files for the first patient and pull up medical files for the patient in the examination room. Then, when the medical worker authenticates at the client device 120-*b*-3 located within the examination room, the medical worker's updated session is switched to client device 120-*b*-3.

Figure 3:
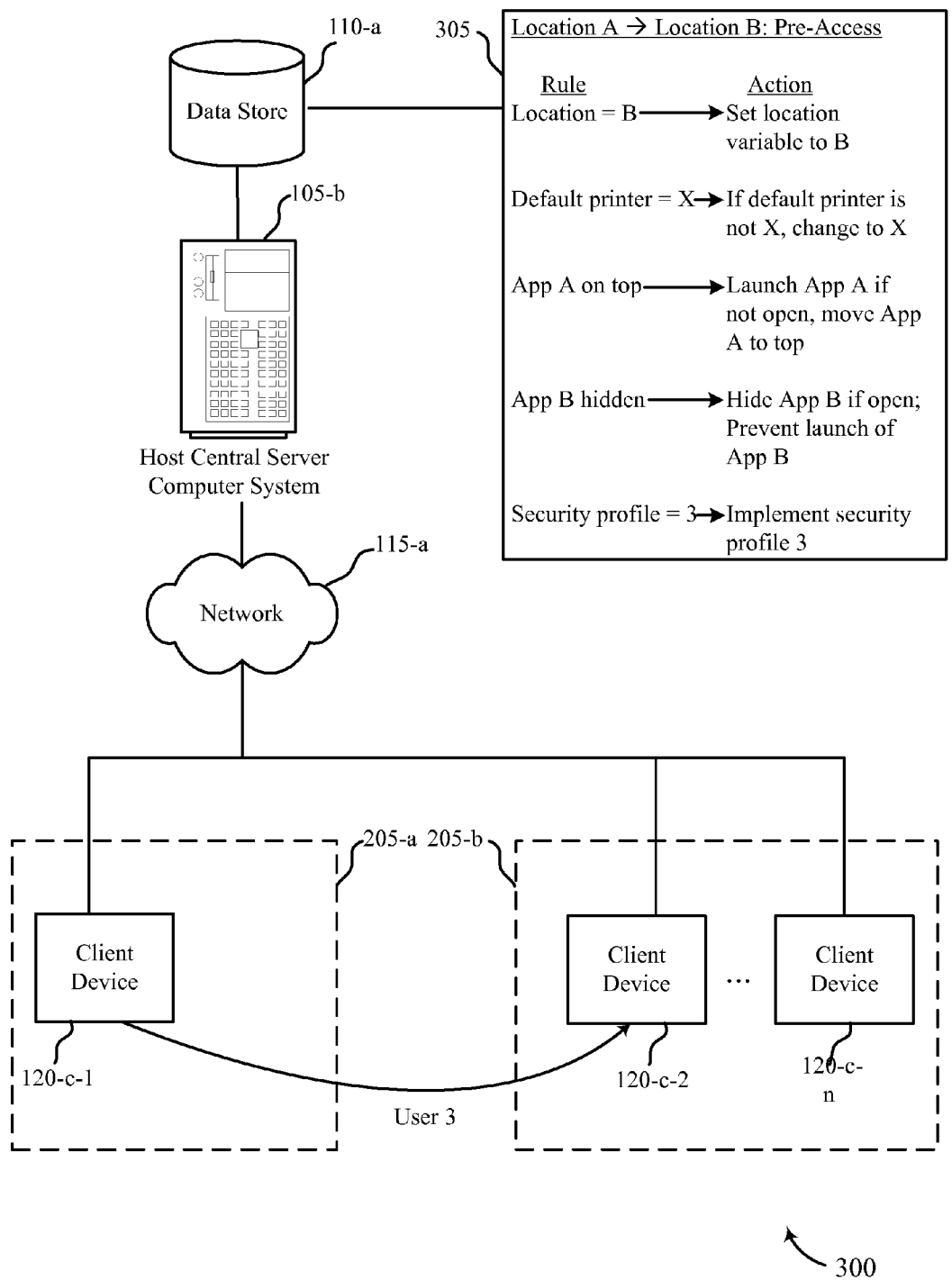
FIG. 3 is a block diagram of an example system including components configured according to various embodiments of the invention.

FIG. 3 is a block diagram illustrating another example of user movement between different locations in a system 300. The system 300 of the present example includes host central server computer system 105-*b,* data store 110-*a,* network 115-*a,* and client devices 120. Each of these components may be in communication, directly or indirectly. The system 300 may be an example of the system 100 described above with reference to FIG. 1 and/or the system 200 described above with reference to FIG. 2.

As shown in FIG. 3, the client devices 120 may be distributed between two locations or regions 205. Client device 120-*c*-1 is associated with location 205-*a,* while client device 120-*c*-2 and client device 120-*c*-n are associated with location 205-*b*. In additional or alternative embodiments, one or more client devices 120 may be associated with other locations 205 (not shown). Each location 205 may be associated with a set of pre-access rules. The set of pre-access rules associated with each location 205 may vary with different users or may remain static for all users.

In the present example, user 3 may initially log on to client device 120-*c*-1 at location 205-*a*. One or more authentication credentials may be provided by user 3 at client device 120-*c*-1 to initiate a session, and client device 120-*c*-1 may forward the authentication credential(s) to host central server computer system 105-*b* for authentication of user 3. In connection with the authentication of user 3 at client device 120-*c*-1, the host central server computer system 105-*b* may initiate a new session associated with user 3, and client device 120-*c*-1 may provide KVM functionality to the session over the network 115-*a*.

As further shown in FIG. 3, user 3 may, after a period of time accessing the session through client device 120-*c*-1, log off of client device 120-*c*-1 and physically move to location 205-*b*. After user 3 has logged off of client device 120-*c*-1, the session generated for user 3 may be maintained by host central server computer system 105-*b* (e.g., for a specified period of time, until a predetermined trigger event occurs, or indefinitely). In this way, when user 3 logs on to client device 120-*c*-2 in location 205-*b,* a new session need not be built from scratch. Rather, the KVM functionality for the existing session already associated with user 3 may be switched to client device 120-*c*-2.

However, before user 3 is permitted to access the session at client device 120-*c*-2, the host central server computer system 105-*b* may determine that user 3 has moved from location 205-*a* to location 205-*b* and retrieve a set of location-based pre-access rules 305 from data store 110-*a* based on the determination. As shown in FIG. 3, the set of pre-access rules 305 for user 3 at location 205-*b* include a first rule for changing a location variable of the session to B, a second rule for making the default printer associated with the session set to X, a third rule for displaying application A as a top window in the user interface of the session, a fourth rule for hiding application B in the user interface of the session, and a fifth rule for setting the security profile to 3.

Each of the pre-access rules 305 is associated with one or more actions. In the present example, the first rule is associated with the action of setting the location variable for the session to B. The second rule is associated with the action of setting the default printer for the session to X if X is not already the default printer. The third rule is associated with the action of launching application A if application A is not open, and moving application A to the top of the user interface. The fourth rule is associated with the action of hiding application B if application B is open, and preventing the launch of application B if application B is not open. The fifth rule is associated with the action of implementing security profile 3 at the session.

Each of the location-based pre-access rules 305 shown in FIG. 3 may be initiated by the host central server computer system 105-b once it is determined that user 3 has moved to location 205-b. User 3 need not interact with any of the client devices 120-c for these actions to be initiated if the location of user 3 can be determined before user 3 attempts to log on to one of the client devices 120-c. Additionally or alternatively, the host central server computer system 105-b may first detect the changed location of user 3 when user 3 enters a first authentication credential for a dual-factor authentication system at client device 120-c-2. In that case, the host central server computer system 105-b may still initiate one or all of the location-based pre-access rules 305 with respect to the existing session prior to completing authentication of user 3 for access to the existing session. By dynamically beginning the process of updating the session based on the location prior to authenticating user 3 for access to the existing session, the delays associated with gaining full access to the session may be reduced for user 3.

In certain examples, the host central server computer system 105-b may prevent user 3 from accessing his or her existing session at location 205-b until each of the actions associated with applying the location-based pre-access rules 305 has been completed with respect to the existing session. Such may be the case where certain critical access permissions are to be updated based on the change in location. Alternatively, user 3 may be allowed to access his or her existing session from client device 120-c-2 after authentication, even if all of the actions associated with applying the location-based pre-access rules 305 have not yet completed.

Figure 4:
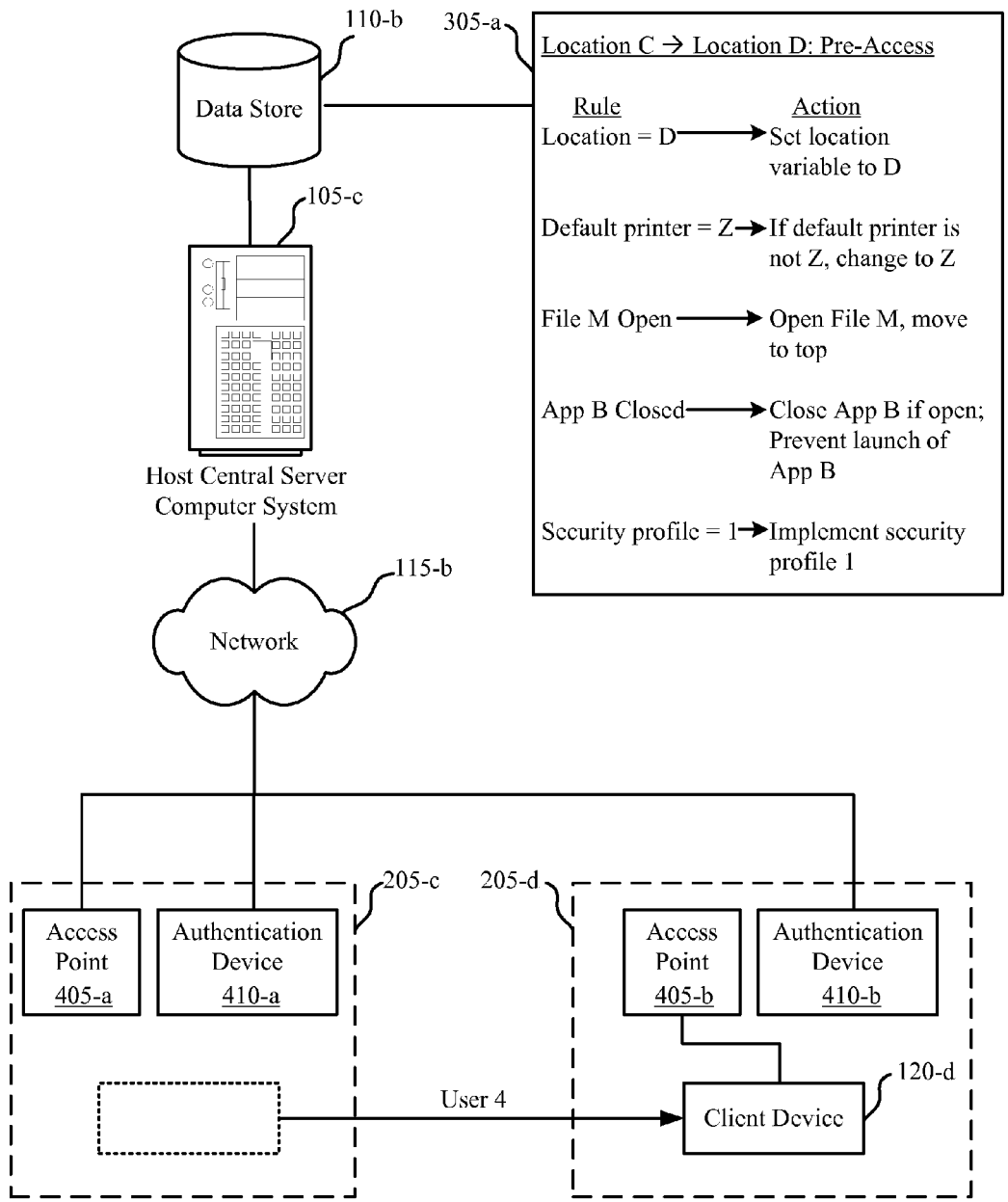
FIG. 4 is a block diagram of an example system including components configured according to various embodiments of the invention.

FIG. 4 is a block diagram illustrating another example of user movement between different locations in a system 400. The system 400 of the present example includes host central server computer system 105-c, data store 110-b, network 115-b, access points 405, authentication devices 410, and client device 120-d. Each of these components may be in communication, directly or indirectly. The system 400 may be an example of the system 100 described above with reference to FIG. 1, the system 200 described above with reference to FIG. 2, and/or the system 300 described above with reference to FIG. 3.

In the example of FIG. 4, one or more access points 405-a may be disposed at each location 205 to provide access to network 115-b. Additionally, in certain examples, one or more authentication devices 410 may be disposed at each location 205 to receive authentication credentials from users and initiate action based on the received credentials. The location of one or more access points 405 and/or authentication devices 410 may be known or ascertainable by host central server computer system 105-c.

In the present example, user 4 may log on to portable client device (e.g., smartphone, tablet computer, laptop, etc.) 120-d at location 205-c, and initiate a session hosted by host central server computer system 105-c. The initiated session may be subject to certain location-based rules associated with location 205-c, a type of the client device 120-d, and/or user 4. User 4 may then move with the client device 120-d to location 205-d.

Host central server computer system 105-c may determine that user 4 has moved from location 205-c to location 205-d in a number of ways. In one example, host central server computer system 105-c may determine that client device 120-d has moved from access point 405-a to access point 405-b for access to network 115-b. Using the known location of access point 405-b, host central server computer system 105-c may extrapolate that client device 120-d, and by extension, user 4, is now at location 205-d. Additionally or alternatively, user 4 may provide authentication credentials (e.g., a key card token, PIN, username, password, biometric token, etc.) at authentication device 410-b to gain access to a room, a piece of equipment, and/or to regain access to the existing session on client device 120-d. Using the known location of the authentication device 410-b, host central server computer system 105-c may extrapolate that user 4 is now at location 205-d.

In response to the determining that client device 120-d has now moved to location 205-d, host central server computer system 105-c may retrieve a set of location-based pre-access rules 305-a associated with user 4 at location 205-d from data store 110-b. Host central server computer system 105-d may perform one or more actions associated with the rules with respect to the existing session for user 4 to enforce or otherwise implement the set of location-based pre-access rules 305-a applicable to user 4 at location 205-b.

The actions associated with applying the rules may be initiated before user 4 begins to access the existing session at location 205-d. For example, consider the example where user 4 is a physician, client device 120-d is a tablet computer, and locations 205-c, 205-d are respective floors of a medical facility. As user 4 leaves a first floor (location 205-c) and approaches an entrance to a second floor (location 205-d), user 4 may be required to present an authentication credential to authentication device 410-b to enter. However, as user 4 stands outside of the entrance and prepares to authenticate, client device 120-d may automatically begin communicating with access point 405-b.

Through this communication, the host central server computer system 105-c may determine that user 4 has left location 205-c and is approaching location 205-d. Accordingly, the host central server computer system 105-c may retrieve the set of applicable location-based pre-access rules 305-a from data store 110-b, and initiate the actions associated with the pre-access rules. Meanwhile, user 4 may provide a passcode, an access card token, a biometric token and/or another type of authentication credential at authentication device 410-b to gain access to the second floor (location 205-d). After providing the authentication credential, user 4 may be permitted to physically enter the second floor. Additionally, the authentication of user 4 may permit user 4 to access his or her existing session through client device 120-d, as modified by the location-based pre-access rules applied prior to authentication by host central server computer system 105-c.

In the example of FIG. 4, a first location-based pre-access rule provides that a location variable associated with the existing session should be set to D. The action associated with the first rule includes setting the location variable to D for the existing session. A second location-based pre-access rule may provide that a default printer for the session is Z. The action associated with the second rule may include configuring the session such that the default printer is Z. A third location-based pre-access rule may provide that file M is to be open at location 205-d. The actions associated with the third rule may include opening file M and moving a window containing file M to the tope of a user interface for the session. A fourth location-based pre-access rule may provide that application B is to be closed at location 205-d. The actions associated with the fourth rule may include closing application B if it is open in the existing session, and taking steps to preventing the future launch of application B at location 205-d. A fifth location-based pre-access rule may provide that a security profile for the session is to be set to level 1 while user 4 is at location 205-d. The action associated with the fifth rule may include adjusting the configurations and settings of the session to implement a predefined level 1 security profile.

Figure 5A:
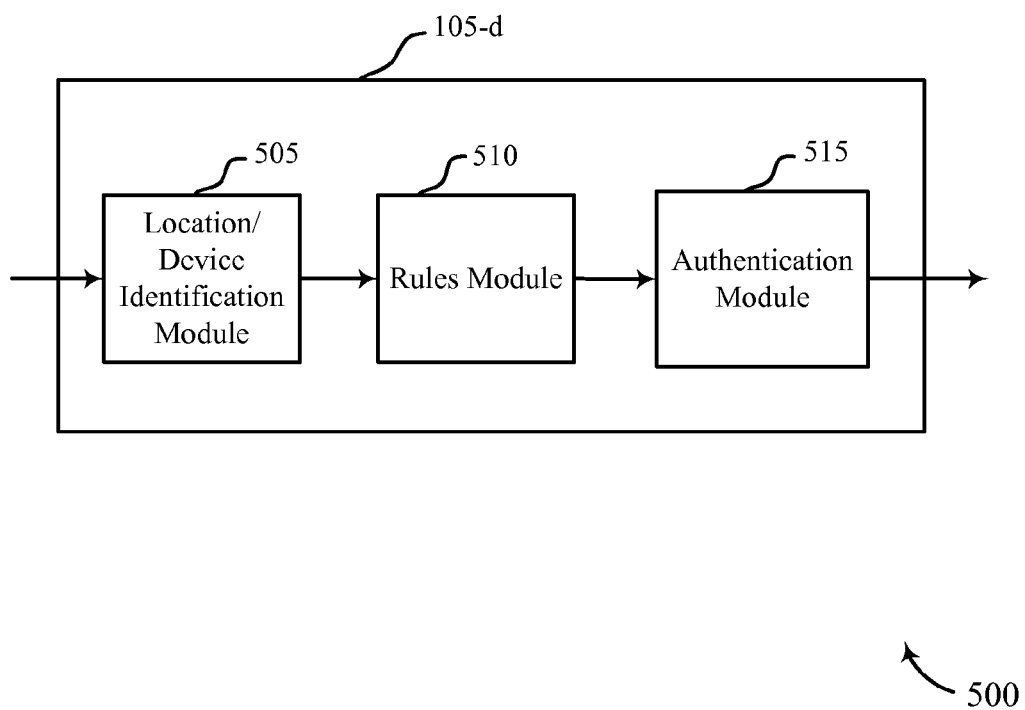
FIG. 5A is a block diagram of an example host central server computer system including components configured according to various embodiments of the invention.

FIG. 5A is a block diagram 500 illustrating an example of host central server computer system 105-d, which may be the host central server computer system 105 described above with reference to FIG. 1, FIG. 2, FIG. 3, and/or FIG. 4. The host central server computer system 105-d may allocate and manage sessions for users at client devices (e.g., the client devices 120 of FIG. 1, FIG. 2, FIG. 3, and/or FIG. 4). The host central server computer system 105-d may include a location/device identification module 505, a rules module 510, and an authentication module 515. Each of these components may be in communication, directly or indirectly. In other examples, any other suitable type of host device or client device may have any subset of this functionality.

The location/device identification module 505 may be configured to determine that a user associated with an existing session on the host central server computer system 105-d has moved from a first location to a second location. As described previously, the location/device identification module 505 may identify the location of the user through a number of ways.

For example, the user location may be identified based on the known location of an access point, wireless router, authentication device, and/or client device associated with the user. In still other examples, other methods of identifying the location of the user may be employed, including, for example, requesting the location from the user, identifying a location of the user device through Global Positioning Service (GPS) and/or wireless triangulation. By monitoring the location of the user, the location/device identification module 505 may detect the user's movement from the first location to the second location.

The rules module 510 may be configured to identify at least one pre-access rule for the existing session based on the second location. The identification of the at least one pre-access rule may be further based on the identity of the user, the user type, a client device associated with the user, the client device type, the time of day, and the like. The rules module 515 may additionally apply the at least one identified pre-access rule to the existing session before authenticating the user for access to the existing session. The at least one identified pre-access rule may be applied to the existing session in response to the determination that the user has moved to the second location. The at least one identified pre-access rule may be associated with one or more actions. In certain examples, applying the at least one identified pre-access rule to the existing session may include initiating the one or more actions associated with the at least one pre-access rule.

The at least one pre-access rule may be associated with at least one action for modifying the session. Examples of the at least one action may include, but are not limited to, modifying a visibility of an application within a user interface of the existing session based on the second location, modifying a session variable based on the second location, opening an application associated with the session based on the second location, closing an application associated with the session based on the second location, modifying an appearance of a user interface of the existing session based on the second location, associating or disassociating one or more printers or other peripheral devices with the session based on the second location, setting one or more defaults for the session based on the second location, modifying a security setting associated with the session based on the second location, allowing the user to access a system resource based on the second location, and/or preventing the user from accessing a system resource based on the second location.

The authentication module 515 may be configured to authenticate the user at the second location for access to the existing session after the at least one pre-access rule has been applied to the existing session. As described previously, the authentication may include a multi-factor authentication in which a portion of the authentication credentials are provided by the user prior to applying the at least one pre-access rule to determine the location of the user, and another portion of the authentication credentials is provided by the user after the at least one pre-access rule has been applied to the existing session. Authentication of the user for access to the existing session at the second location may be based on the authentication credentials provided both before and after applying the at least one pre-access rule to the existing session.

Figure 5B:
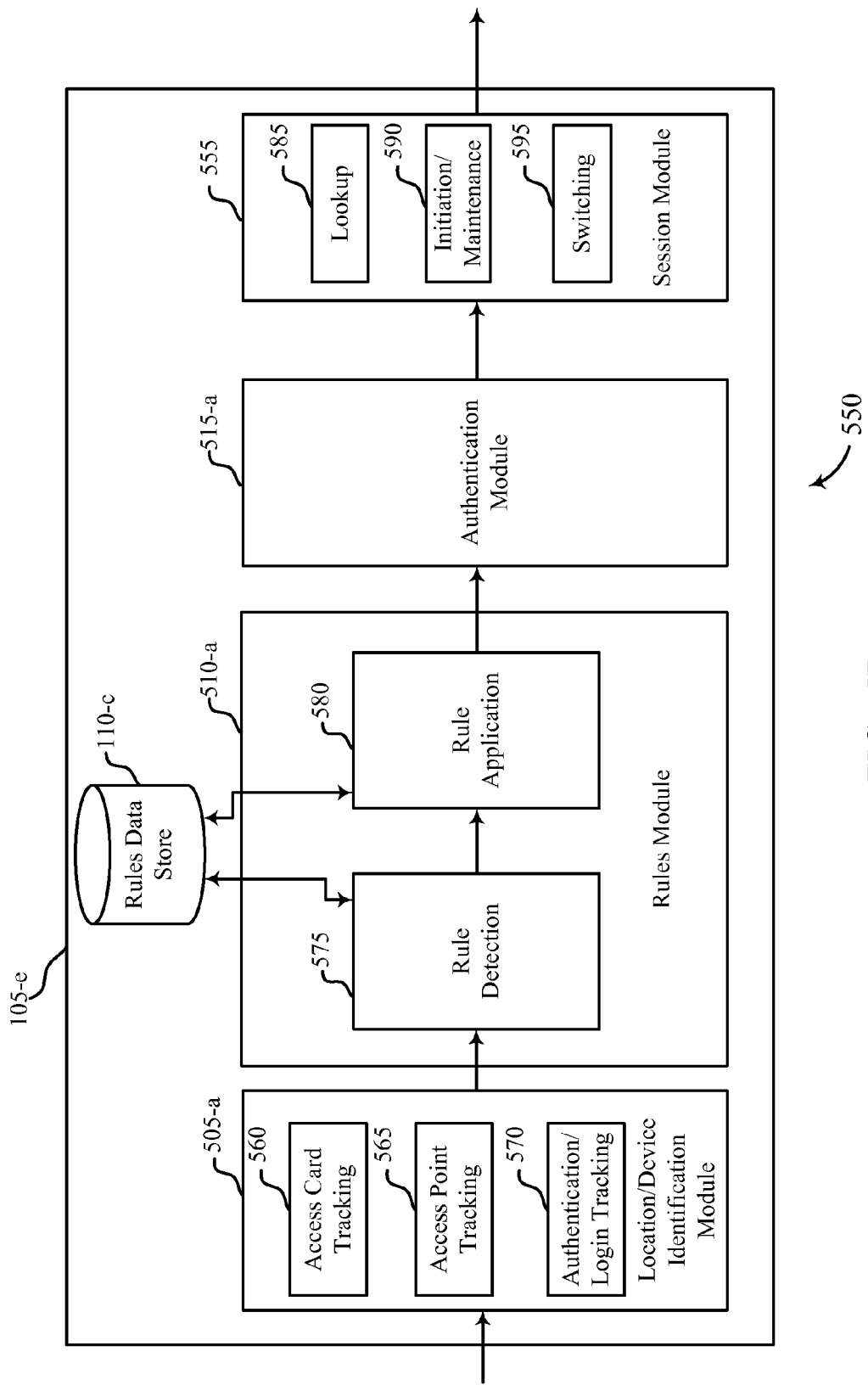
FIG. 5B is a block diagram of an example host central server computer system including components configured according to various embodiments of the invention.

FIG. 5B is a block diagram 550 of another example of a host central server computer system 105-e, which may be the host central server computer system 105 described above with reference to FIG. 1, FIG. 2, FIG. 3, FIG. 4, and/or FIG. 5A. The host central server computer system 105-d may allocate and manage sessions for users at client devices (e.g., the client devices 120 of FIG. 1, FIG. 2, FIG. 3, and/or FIG. 4). The host central server computer system 105-e may include a location/device identification module 505-a, a rules module 510-a, and an authentication module 515-a, which may be examples of the location/device identification module 505, the rules module 510, and the authentication module 515 described above with reference to FIG. 5A. The host central server computer system 105-e of the present example may also include a session module 555 configured to host and manage the various sessions for the user. Each of these components may be in communication, directly or indirectly. In other examples, any other suitable type of host device or client device may have any subset of this functionality.

In some examples, the location/device identification module 505-a monitors the location of users having existing sessions hosted by the session module 555 (e.g., via direct monitoring or via reports from client devices (e.g., client devices 120 of FIGS. 1-4). To initiate a session, a user may log on to a client device by transmitting authentication credentials (a user name, password, key card, key fob, and/or biometric sign-in, etc.) to the host central server computer system 105-e. The authentication submodule 515-a may receive the authentication credentials and verify the identity of the user. A lookup submodule 585 of the session module 555 may look up a number of location-based rules for the new session, and the initiation/maintenance submodule 590 of the session module 555 may direct a session to be started for that user. Based on the location-specific rules, the user may have certain location-specific configurations, settings, and access permissions. When the user logs out, the session (and access permissions) may be maintained (e.g., for a system specified time period, a user-specified time period, a user specific time period, or indefinitely) by the initiation/maintenance submodule 590 of the session module. The user may then roam.

The location/device identification module 505-a may monitor the movement of the user. In the present example, an access card tracking submodule 560 may monitor the location of the user based on data from proximity card readers associated with known locations. Access point tracking submodule 565 may monitor the location of the user based on data from one or more network access points associated with known locations. Authentication/login tracking submodule 570 may monitor the location of the user based on attempts by the user to log on to client devices having known locations.

Once the location/device identification module 505-*a* has determined that the user has moved from the user's initial location to a second location, rule detection submodule 575 of rules module 510-*a* may identify the user, the session, and a rule triggering event (e.g., the movement of the user to the second location). The rule detection submodule 575 may access rules data store 110-*a* to retrieve a number of location-based pre-access rules for the session. There may be location-based pre-access rules that are globally applicable and/or location-based pre-access rules for individual users, types of users, sessions, types of sessions, applications, client devices, types of client devices, locations, types of locations, and transitions between certain locations.

The rule application submodule 580 may initiate actions associated with the location-based pre-access rules to apply the identified location-based pre-access rules to the session. These actions may occur in response to the determination that the user has moved to the new location, and prior to authenticating the user for access to the existing session from the second location. For example, at least one action may be initiated in a dual-factor authentication system after receiving a first authentication credential from the user at the second location, but before receiving a second authentication credential. These actions may update or begin to update the session based on the second location before the user is given access to the session at the second location.

After the applicable location-based pre-access rule(s) have been applied to the session, the authentication module 515-*a* may authenticate the user at the second location, and the switching submodule 595 of the session module may switch KVM and/or other peripheral functionality for the session to the client device associated with the user at the second location.

Figure 6:
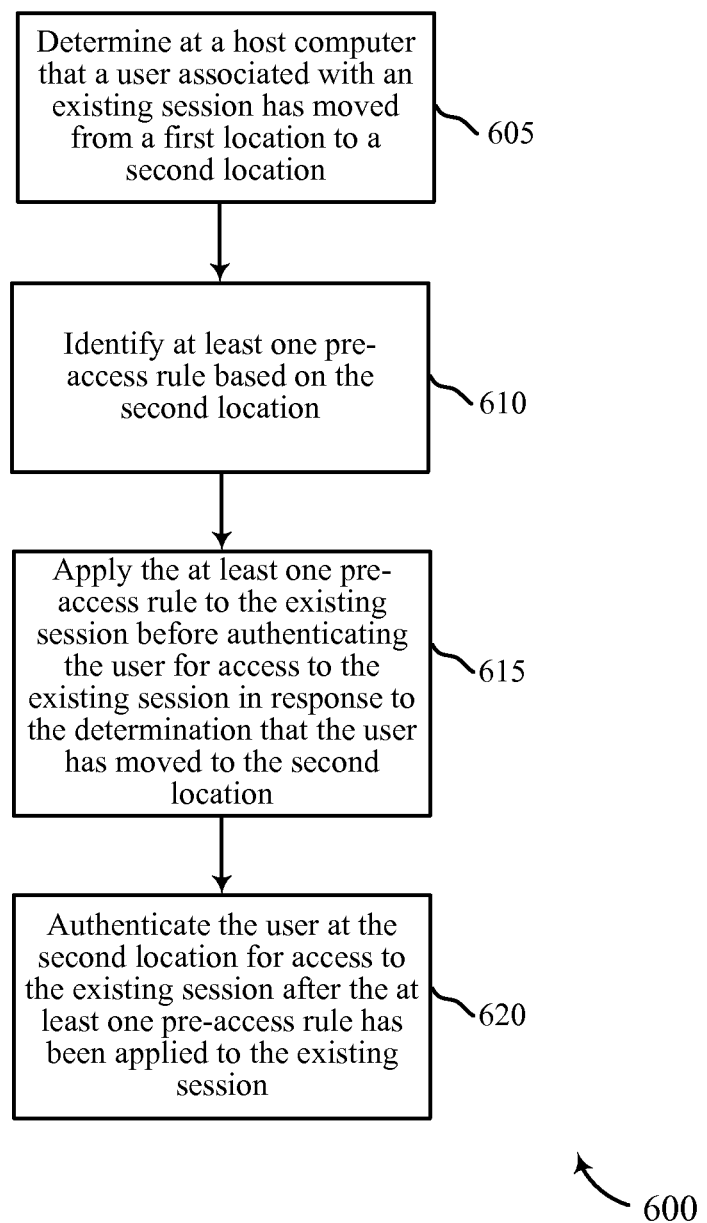
FIG. 6 is a flowchart diagram of an example method of pre-access location-based rule initiation in a virtual computing environment, according to various embodiments of the invention.

Referring next to FIG. 6, a flow chart is shown illustrating a method 600 for updating pre-access location-based rule initiation in a virtual desktop environment. This method 600 may, for example, be performed in whole or in part by the system 100 of FIG. 1, the system 200 of FIG. 2, the system 300 of FIG. 3, the system 400 of FIG. 4, or the host central server computer system 105 of FIG. 1, FIG. 2, FIG. 3, FIG. 4, FIG. 5A, or FIG. 5B.

At block 605, it is determined at a host computer system (e.g., host central sever computer system 105) that a user associated with an existing session has moved from a first location associated with a first set of access permissions to a second location associated with a second set of access permissions. The determination may be made in a variety of ways. For example, the host computer may actively request information from the user to determine a current location of the user. Additionally or alternatively, the host computer may passively detect changes in the user's location based on indications received from an access card reader at the second location, other device associated with controlled access at the second location, and/or other sensor at the second location. In still additional or alternative examples, the change in the user's location may be detected based on a detected location of a client device associated with the user. For example, the host computer server system may determine that the client device associated with the user has established communication with an access point at the second location. The host computer system may receive a first authentication token (e.g., an access card token, a username, etc.) in a dual-factor authentication process and detect the change in the user's location based on the location at which the first authentication token is received.

At block 610, at least one pre-access rule is identified for the existing session based on the second location. The at least one pre-access rule may be retrieved from a data store associated with the host computer server system. The at least one pre-access rule may be associated with at least one action for modifying the session.

Examples of the at least one action may include, but are not limited to, modifying a visibility of an application within a user interface of the existing session based on the second location, modifying a session variable based on the second location, opening an application associated with the session based on the second location, closing an application associated with the session based on the second location, modifying an appearance of a user interface of the existing session based on the second location, associating or disassociating one or more printers or other peripheral devices with the session based on the second location, modifying a security setting associated with the session based on the second location, allowing the user to access a system resource based on the second location, and/or preventing the user from accessing a system resource based on the second location.

At block 615, the at least one pre-access rule is applied to the existing session before authenticating the user for access to the existing session. The at least one pre-access rule may be applied to the existing session in response to the determination that the user has moved to the second location. In certain examples, applying the at least one pre-access rule to the existing session includes initiating one of the actions associated with the at least one pre-access rule, as set forth above, in response to the determination that the user has moved to the second location.

At block 620, the user is authenticated at the second location for access to the existing session after the at least one pre-access rule has been applied to the existing session. In certain examples, dual-factor authentication is used in which a first authentication factor is received from the user, the user and existing session are identified from the first authentication factor, the at least one pre-access rule is applied to the existing session, and then authentication of the user is completed by receiving the second authentication factor after at least one pre-access rule has been applied to the existing session.

In response to successful authentication, the user may be provided with access to the existing session at the second location. By applying the at least one pre-access rule to the existing session before authenticating the user, a latency between authenticating the user and providing the user access to the existing session may be reduced. For example, the use of the at least one pre-access rule may reduce or eliminate the need to perform additional updates or actions to update the existing session after authentication of the user.

Figure 7:
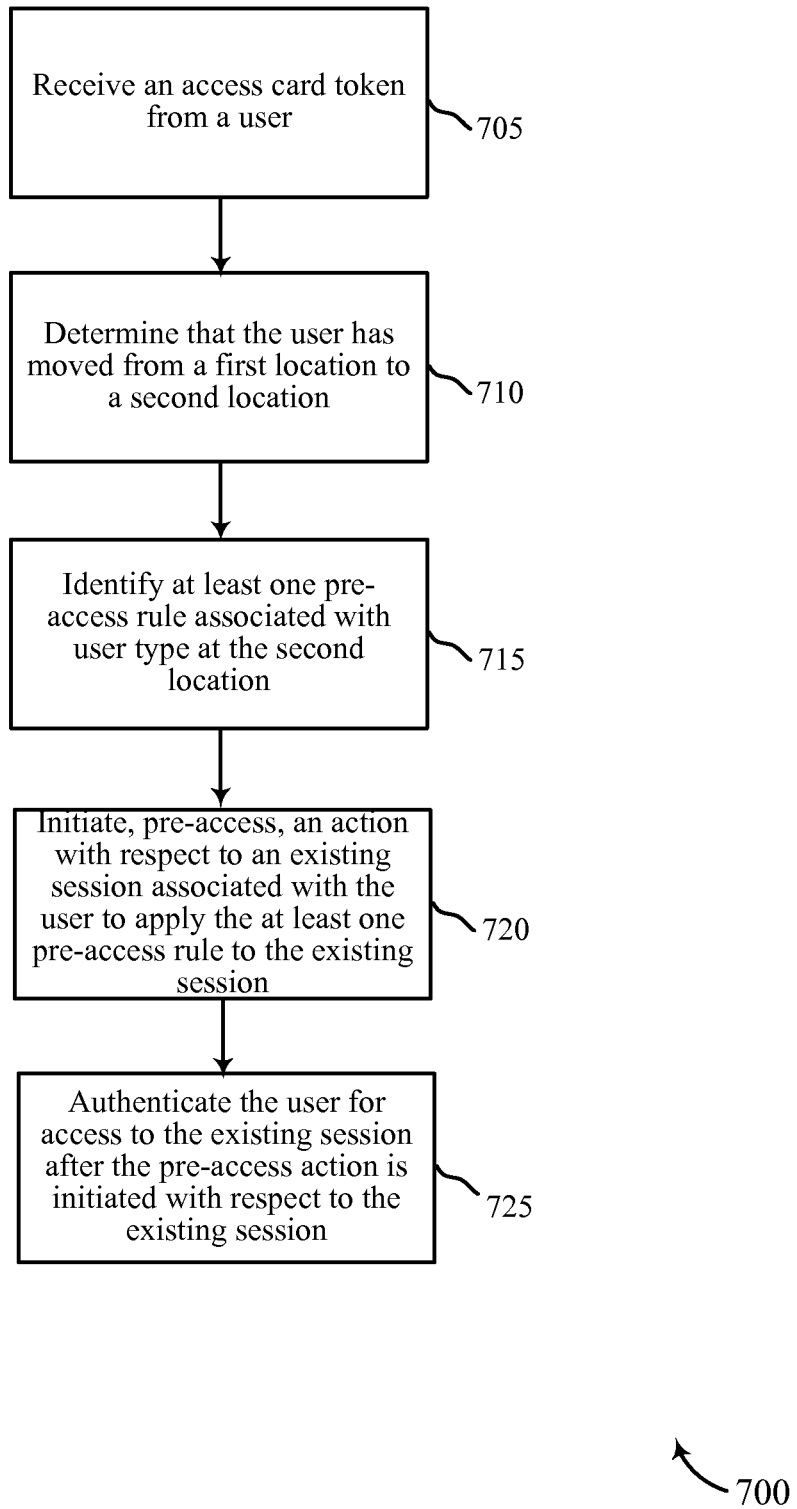
FIG. 7 is a flowchart diagram of an example method of pre-access location-based rule initiation in a virtual computing environment, according to various embodiments of the invention.

Referring next to FIG. 7, a flow chart is shown illustrating an alternative method 700 for updating resource access permissions in a virtual desktop environment. This method 700 may, for example, be performed in whole or in part by the system 100 of FIG. 1, the system 200 of FIG. 2, the system 300 of FIG. 3, the system 400 of FIG. 4, or the host central server computer system 105 of FIG. 1, FIG. 2, FIG. 3, FIG. 4, FIG. 5A, or FIG. 5B.

At block 705, an access card token is received from a user. The access card token may be received from the user as the user gains access to a controlled region. Additionally or alternatively, the access card token may be received from the user at a client device as a first authentication credential in a dual-factor authentication process. At block 710, it is determined that the user has moved from a first location to a second location based on the received access card token. At block 715, at least one pre-access rule associated with the user type at the second location is identified. At block 720, a pre-access action is initiated with respect to an existing session associated with the user to apply the at least one pre-access rule to the existing session. At block 725, the user is authenticated for access to the existing session after the pre-access action has been initiated with respect to the existing session.

Figure 8:
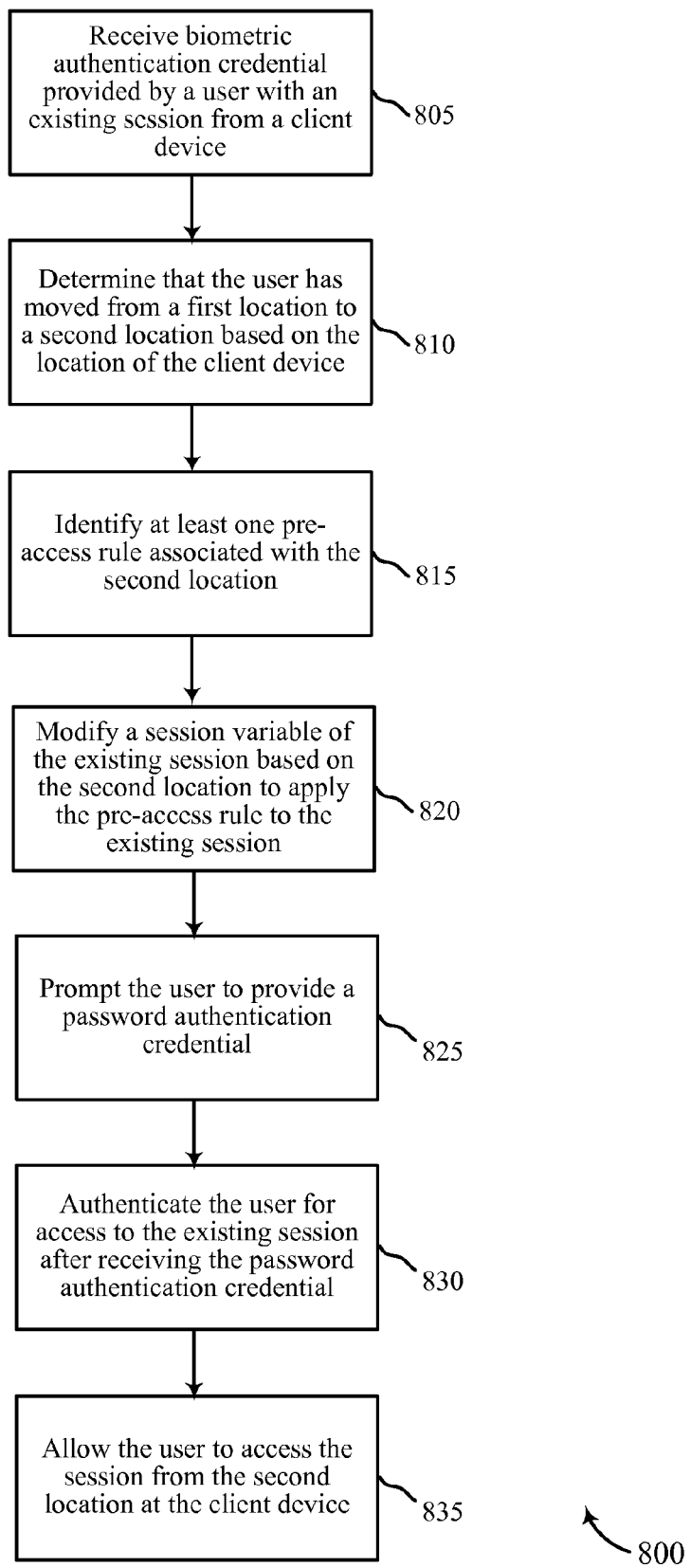
FIG. 8 is a flowchart diagram of an example method of pre-access location-based rule initiation in a virtual computing environment, according to various embodiments of the invention.

Referring next to FIG. 8, a flow chart is shown illustrating another method 800 for updating resource access permissions in a virtual desktop environment. This method 800 may, for example, be performed in whole or in part by the system 100 of FIG. 1, the system 200 of FIG. 2, the system 300 of FIG. 3, the system 400 of FIG. 4, or the host central server computer system 105 of FIG. 1, FIG. 2, FIG. 3, FIG. 4, FIG. 5A, or FIG. 5B.

At block 805, a biometric authentication credential is received from a user with an existing session at a client device. At block 810, a determination is made that the user has moved from a first location to a second location based on the location of the client device. At block 815, at least one pre-access rule associated with the second location is identified. At block 820, a session variable of the existing session is modified based on the second location to apply the pre-existing access rule to the existing session. The session variable may be modified in response to the determination that the user has moved to the second location. At block 825, the user is prompted to provide a password authentication credential. At block 830, the user is authenticated for access to the existing session after receiving the password authentication credential. At block 835, the user is provided with access to the existing session, as modified by the change to the session variable, from the second location after receiving the password authentication credential.

Figure 9:
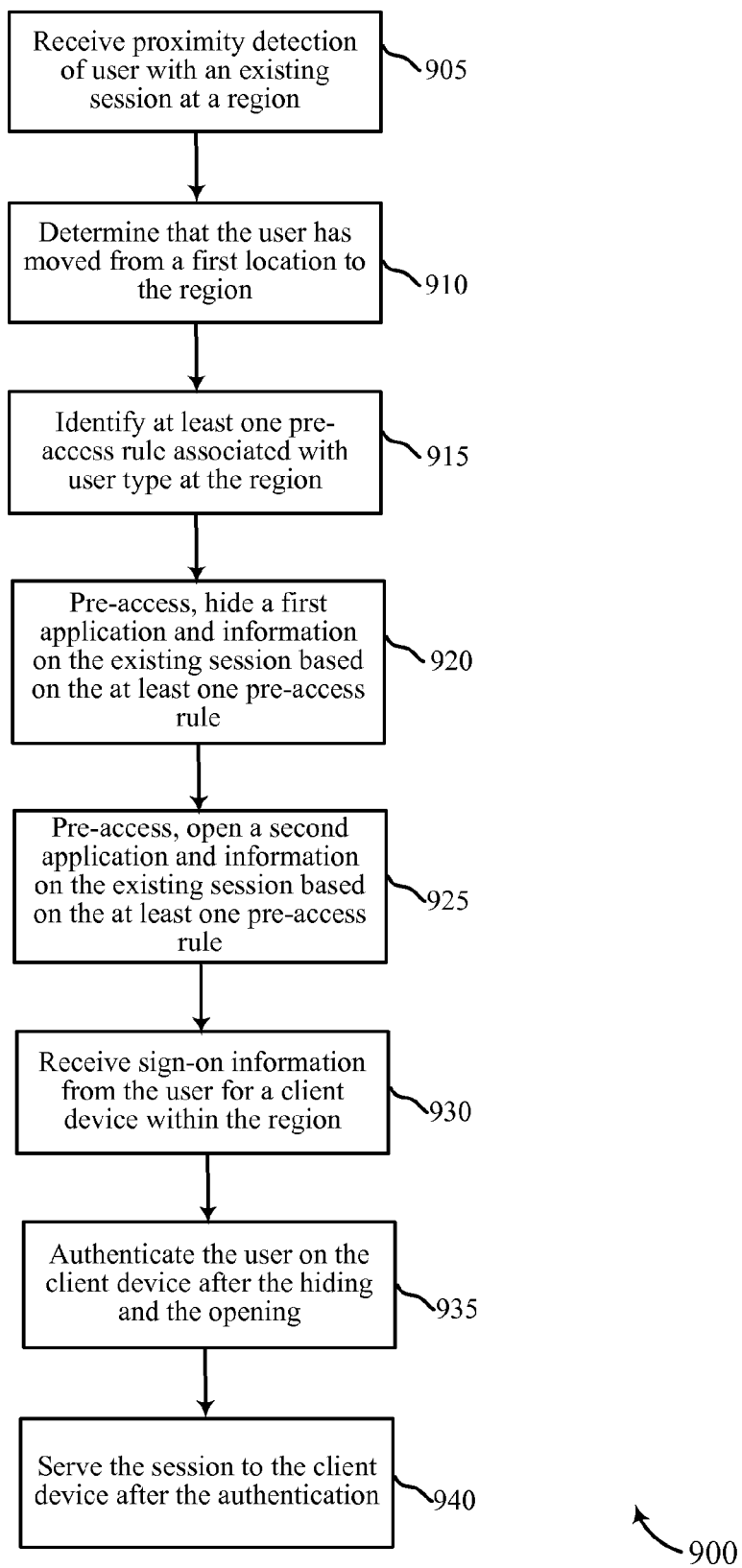
FIG. 9 is a flowchart diagram of an example method of pre-access location-based rule initiation in a virtual computing environment, according to various embodiments of the invention.

Referring next to FIG. 9, a flow chart is shown illustrating another method 900 for updating resource access permissions in a virtual desktop environment. This method 900 may, for example, be performed in whole or in part by the system 100 of FIG. 1, the system 200 of FIG. 2, the system 300 of FIG. 3, the system 400 of FIG. 4, or the host central server computer system 105 of FIG. 1, FIG. 2, FIG. 3, FIG. 4, FIG. 5A, or FIG. 5B.

At block 905, a proximity detection of a user with an existing session is received at a region. The proximity detection of the user may be made by a proximity card reader and/or other type of proximity reader. At block 910, a determination is made that the user has moved from a first location to the region. At block 915, at least one pre-access rule associated with the user type at the region is identified. At block 920, a first application and information are hidden pre-access on the existing session to apply the at least one pre-access rule to the session. At block 925, a second application and information are opened on the existing session to apply the at least one pre-access rule to the session. At block 930, sign-on authentication credentials are received from the user for a client device within the region. At block 935, the user is authenticated on the client device after the hiding and opening of blocks 920 and 925. At block 940, the existing session is served to the client device after the user has been authenticated.

The functionality of the host central server computer system 105 of FIG. 1, FIG. 2, FIG. 3, FIG. 4, FIG. 5A, or FIG. 5B; the location/device identification module of 505 of FIG. 5A or FIG. 5B; the rules module 510 of FIG. 5A or FIG. 5B; the authentication module 515 of FIG. 5A or FIG. 5B; and/or the client device 120 of FIG. 1, FIG. 2, FIG. 3, or FIG. 4, may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 10:
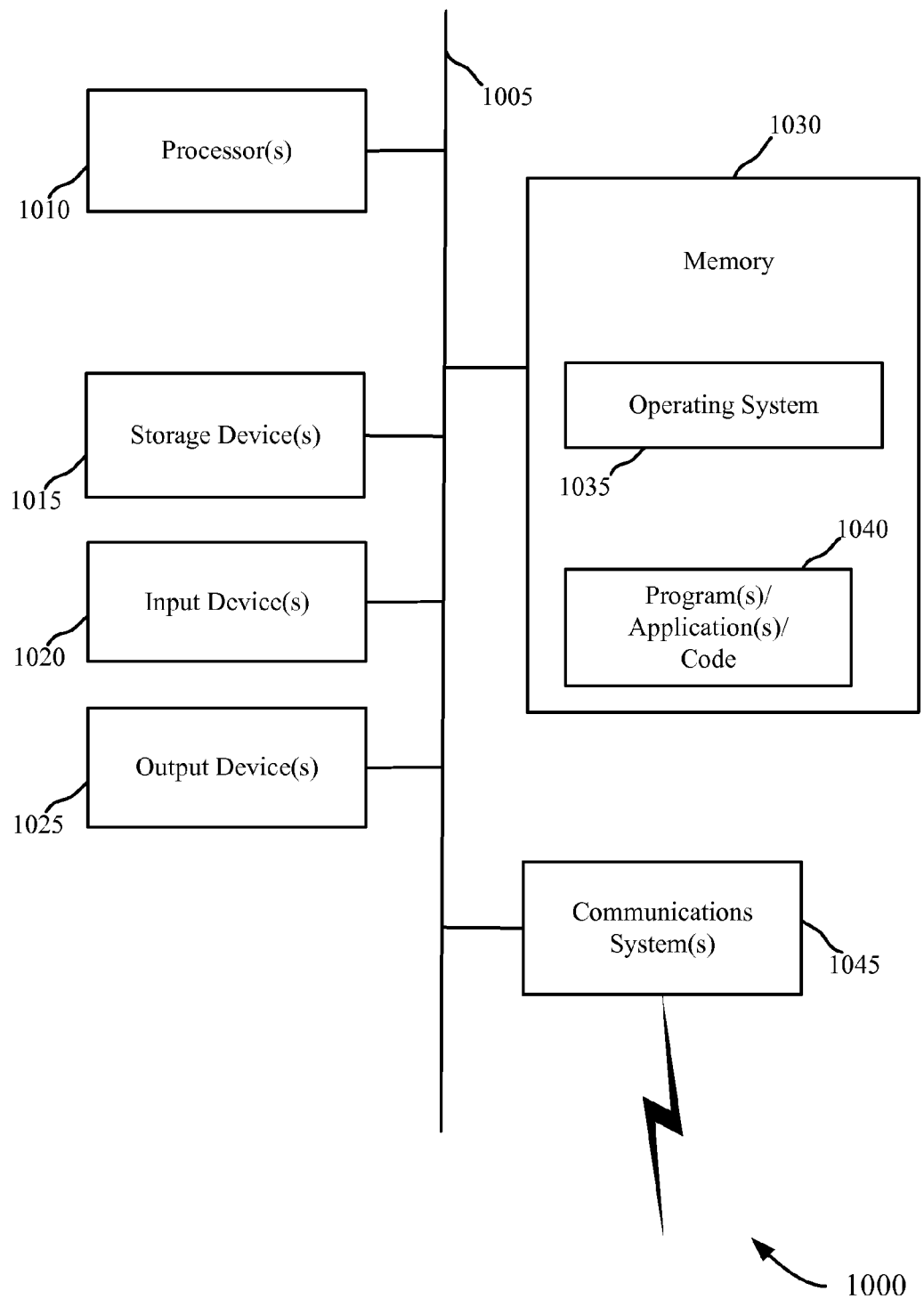
FIG. 10 is a schematic diagram that illustrates a representative device structure that may be used in various embodiments of the present invention.

A device structure 1000 that may be used for one or more components of host central server computer system 105 of FIG. 1, FIG. 2, FIG. 3, FIG. 4, FIG. 5A, or FIG. 5B, or the client device 120 of FIG. 1, FIG. 2, FIG. 3, or FIG. 4, or for other computing devices described herein, is illustrated with the schematic diagram of FIG. 10. This drawing broadly illustrates how individual system elements of each of the aforementioned devices may be implemented, whether in a separated or more integrated manner. Thus, any or all of the various components of one of the aforementioned devices may be combined in a single unit or separately maintained and can further be distributed in multiple groupings or physical units or across multiple locations. The example structure shown is made up of hardware elements that are electrically coupled via bus 1005, including processor(s) 1010 (which may further comprise a DSP or special-purpose processor), storage device(s) 1015, input device(s) 1020, and output device(s) 1025. The storage device(s) 1015 may be a machine-readable storage media reader connected to any machine-readable storage medium, the combination comprehensively representing remote, local, fixed, or removable storage devices or storage media for temporarily or more permanently containing computer-readable information. The communications system(s) interface 1045 may interface to a wired, wireless, or other type of interfacing connection that permits data to be exchanged with other devices. The communications system(s) interface 1045 may permit data to be exchanged with a network.

The structure 1000 may also include additional software elements, shown as being currently located within working memory 1030, including an operating system 1035 and other code 1040, such as programs or applications designed to implement methods of the invention. It will be apparent to those skilled in the art that substantial variations may be used in accordance with specific requirements. For example, customized hardware might also be used, or particular elements might be implemented in hardware, software (including portable software, such as applets), or both.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof When implemented in software, firmware, middleware, or microcode, the program code or code segments to perform the necessary tasks may be stored in a computer-readable medium such as a storage medium. Processors may perform the necessary tasks.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A system for implementing a virtual computing environment, comprising:
   a host computer system configured to:
      determine that a user associated with an existing session has moved from a first location to a second location;
      identify at least one pre-access rule associated with the second location;
      begin modifying the existing session based on the identified at least one pre-access rule before authenticating the user for access to the existing session in response to the determination that the user has moved to the second location;
      authenticate the user at the second location for access to the existing session after modification of the existing session has begun; and
      provide the user access to the modified session at the second location in response to the authenticating the user at the second location, wherein the modifying the existing session before authenticating the user reduces a latency between the authenticating the user and the providing the user access to the modified session at the second location; and
   a client device configured to communicate with the host computer system to provide a user interface to the existing session for the user at the second location.

2. The system of claim 1, wherein the host computer system is further configured to:
   retrieve the at least one pre-access rule from a data store;
   wherein the at least one pre-access rule is associated with at least one action.

3. The system of claim 2, wherein the at least one action comprises at least one of:
   modifying a visibility of an application within a user interface of the existing session based on the second location, modifying a session variable based on the second location, opening an application associated with the session based on the second location, closing an application associated with the session based on the second location, modifying an appearance of a user interface of the existing session based on the second location, associating or disassociating one or more printers or other peripheral devices with the session based on the second location, modifying a security setting associated with the session based on the second location, allowing the user to access a system resource based on the second location, preventing the user from accessing a system resource based on the second location, or combinations thereof.

4. The system of claim 2, wherein the host computer system is further configured to:
   initiate the at least one action with respect to the existing session at the host computer system based on the at least one pre-access rule and in response to the determination that the user has moved to the second location.

5. A method of pre-access location-based rule initiation in a virtual computing environment, comprising:
   determining at a host computer system that a user associated with an existing session has moved from a first location to a second location;
   identifying at least one pre-access rule associated with the second location;
   begin modifying the existing session based on the identified at least one pre-access rule before authenticating the user for access to the existing session in response to the determination that the user has moved to the second location;
   authenticating the user at the second location for access to the existing session after the modification of the existing session has begun; and
   providing the user access to the modified session at the second location in response to the authenticating the user at the second location, wherein the modifying the existing session before authenticating the user reduces a latency between the authenticating the user and the providing the user access to the modified session at the second location.

6. The method of claim 5, further comprising:
retrieving the at least one pre-access rule from a data store;
wherein the at least one pre-access rule is associated with at least one action.

7. The method of claim 6, further comprising:
initiating the at least one action with respect to the existing session at the host computer system based on the at least one pre-access rule and in response to the determination that the user has moved to the second location.

8. The method of claim 6, wherein the at least one action comprises:
modifying a visibility of an application within a user interface of the existing session based on the second location.

9. The method of claim 6, wherein the at least one action comprises:
modifying a session variable based on the second location.

10. The method of claim 6, wherein the at least one action comprises:
opening an application associated with the session based on the second location.

11. The method of claim 6, wherein the at least one action comprises:
closing an application associated with the session based on the second location.

12. The method of claim 6, further comprising:
preventing the user from accessing the session at the host computer system until after the at least one action has completed.

13. The method of claim 5, further comprising:
receiving a first authentication credential from the user at the second location prior to applying the at least one pre-access rule, the determination that the user has moved to the second location being based on the received first authentication credential; and
receiving a second authentication credential from the user at the second location after beginning to modify the existing session based on the at least one pre-access rule.

14. The method of claim 13, wherein the authenticating the user at the second location for access to the existing session occurs in response to receiving both the first authentication credential and the second authentication credential.

15. The method of claim 13, further comprising:
prompting the user to provide the second authentication credential after beginning to modify the existing session based on the at least one pre-access rule.

16. The method of claim 5, wherein the determining that the user has moved to the second location comprises:
receiving an indication from a device associated with controlled access to the second location that the user has entered the second location.

17. The method of claim 5, wherein the determining that the user has moved to the second location comprises:
determining that a client device associated with the user is in communication with an access point associated with the second location.

18. The method of claim 5, wherein the determining that the user has moved to the second location comprises:
receiving an indication that at least one sensor at the second location has detected a presence of the user.

19. A host computer system, comprising:
a location identification module configured to determine that a user associated with an existing session has moved from a first location to a second location;
a rules module configured to identify at least one pre-access rule associated with the second location and begin modifying the existing session based on the identified at least one pre-access rule before authenticating the user for access to the existing session in response to the determination that the user has moved to the second location;
an authentication module configured to authenticate the user at the second location for access to the existing session after the modification of the existing session has begun; and
a session module configured to provide the user access to the modified session at the second location in response to the authenticating the user at the second location, wherein the modifying the existing session before authenticating the user reduces a latency between the authenticating the user and the providing the user access to the modified session at the second location.

20. The host computer system of claim 19, wherein the authentication module is further configured to:
receive a first authentication credential from the user at the second location prior to applying the at least one pre-access rule;
wherein the determination that the user has moved to the second location is based on the received first authentication credential.

21. The host computer system of claim 20, wherein the authentication module is further configured to:
prompt the user for a second authentication credential after beginning to modify the existing session based on the at least one pre-access rule;
receive the second authentication credential from the user at the second location after beginning to modify the existing session based on the at least one pre-access rule;
wherein the authenticating the user at the second location for access to the existing session occurs in response to receiving both the first authentication credential and the second authentication credential.

22. The host computer system of claim 19, wherein the rules module is further configured to:
retrieve the at least one pre-access rule from a data store, wherein the at least one pre-access rule is associated with at least one action; and
initiate the at least one action with respect to the existing session at the host computer system in response to the determination that the user has moved to the second location.

23. The host computer system of claim 22, wherein the at least one action comprises:
modifying a visibility of an application within a user interface of the existing session based on the second location.

24. The host computer system of claim 22, wherein the at least one action comprises:
modifying a session variable based on the second location.

25. The host computer system of claim 22, wherein the at least one action comprises:
opening an application associated with the session based on the second location.

26. The host computer system of claim 22, wherein the at least one action comprises:
closing an application associated with the session based on the second location.

* * * * *